March 15, 1955     W. S. FREEMAN     2,704,100
BOTTLES AND LIKE CONTAINERS AND CLOSURES THEREFOR
Filed Jan. 15, 1953
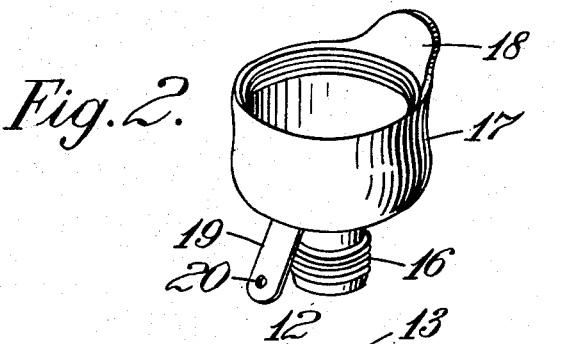
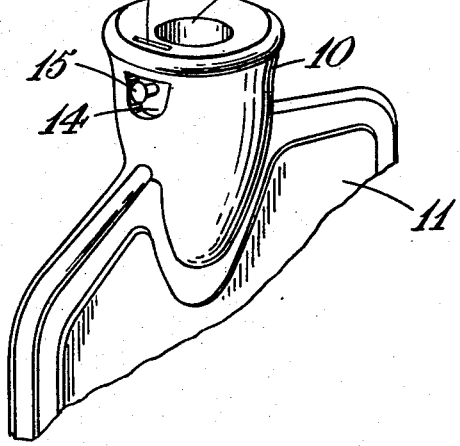
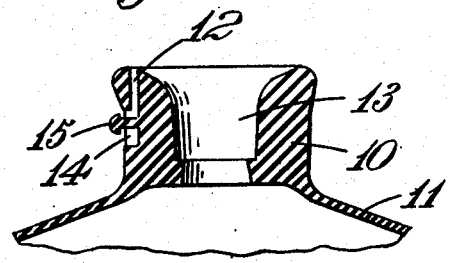
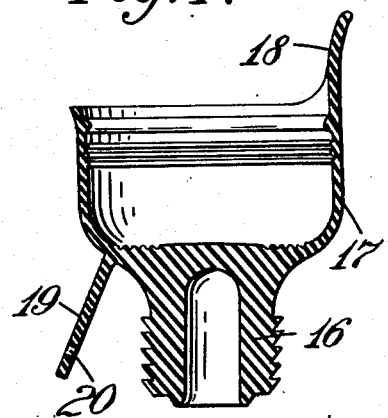
Inventor
William S. Freeman
By Young, Emery & Thompson
Attys.

United States Patent Office 2,704,100
Patented Mar. 15, 1955

2,704,100
BOTTLES AND LIKE CONTAINERS AND CLOSURES THEREFOR

William Simon Freeman, Barnsley, England

Application January 15, 1953, Serial No. 331,381

Claims priority, application Great Britain January 28, 1952

4 Claims. (Cl. 150—8)

This invention is for improvements in or relating to bottles and like containers and closures therefor, and has for one of its objects to provide simple and efficient means for anchoring the closure to the container. The invention is particularly applicable to rubber hot water bottles.

In United States Patent No. 2,215,392 a construction is described in which the closure is of rubber and comprises a plug portion to enter and close the mouth of the container, and a skirt to be folded down around the outside of the neck of the container to provide an additional seal, and in which the closure is anchored to the container by a flexible hinging member which is integral with the closure and is vulcanized in position in a housing in the neck of the bottle. This housing takes the form of a recess which reaches down inside the thickness of the neck of the container and its only aperture is in the rim of the neck close to the mouth of the container.

According to the primary feature of the present invention, there are provided a container and rubber closure therefor, which latter is anchored to the container by a flexible hinging member integral with the closure and received in a housing inside the thickness of the neck of the container, which housing opens on to the rim of the neck close to the mouth of the container, which container and closure are characterised in that the said housing has a second opening situated some distance down the outside of the neck of the container, so that the housing takes the form of a through-way in the thickness of the neck of the container, which through-way is closed except at its ends. The hinging member and the through-way will usually be of oblong cross-section with the larger dimension (the width) extending in the direction circumferentially around the neck.

To assist to anchor the hinging member in position, it may be perforated near its free end to engage over an undercut stud projecting laterally from the neck of the container. Conveniently, this stud is integral with the material of the neck of the container and springs from the base of a shallow recess in the outside of the neck. The lower aperture of the through-way leads to this recess which is preferably of such shape and dimensions as to house the end of the hinging member when the latter has engaged the stud.

The invention includes the method of assembling the container and rubber closure. The hinging member, which is flexible, is a close fit in the through-way. After the free end of the hinging member has been inserted in the upper end of the through-way the resilience of the rubber permits the hinging member to be drawn into place by a pull applied to its free end by a tool inserted through the said second opening. This pull causes the hinging member to contract in width and thickness, but when the hinging member has been drawn into position and the pull ceases, the width and thickness expand again and cause the hinging member to grip the walls of the through-way and take anchorage therein.

For a more complete understanding of the invention, there will now be described, by way of example only and with reference to the accompanying drawings, one construction of rubber hot water bottle and closure therefor according to the invention. It is to be understood, however, that the invention is not restricted to the precise constructional details set forth.

In these drawings:

Figure 1 is a perspective view of the upper portion of the bottle, before the closure has been assembled in position, Figure 2 is a perspective view of the closure before assembly in the bottle, Figure 3 is a sectional view of the upper portion of the bottle, and Figure 4 is a sectional view of the closure, on a scale larger than that of Figure 2.

Like reference numerals indicate like parts throughout the drawings.

The neck 10 of the bottle 11 has a through-way 12 formed in it (see particularly Figure 3) the upper end of which through-way opens on to the rim of the bottle close to the mouth 13. The through-way is of oblong cross-section and its lower end leads to a shallow recess 14 in the outside of the neck 10. An undercut stud 15 springs from the base of the recess 14.

The closure comprises a serrated plug portion 16 to enter and close the mouth 13 of the bottle, and a skirt 17 to be folded down around the outside of the neck 10 to provide an additional seal. The skirt has a finger piece 18 for use in folding the skirt into inoperative position, and a hinging member 19 reaches downwardly and outwardly from the underface of the base of the skirt. This hinging member is of such shape and dimensions as to be a close fit in the through-way 12, and it is perforated at 20 near its free end. When the hinging member 19 has been assembled in the through-way, its perforation engages over the stud 15 and the end of the hinging member lies in the recess 14. The parts are preferably so arranged that the skirt 17, when folded down into sealing position, overlies and extends below the recess 14, the stud 15 and the end of the hinging member 19.

The hinging member 19 is intended to retain the closure anchored to the bottle, even when the skirt 17 has been folded into inoperative position and the plug 16 has been pulled out of the mouth of the container.

As already stated, the invention is particularly applicable to rubber hot water bottles. It is also to be understood that the invention is not restricted to the precise constructional details set forth.

I claim:

1. A container of rubber or the like having a neck provided with a passageway extending longitudinally thereof between the inner and outer surfaces of the neck, said passageway opening at the upper rim of the neck, said neck having an opening in the outer surface thereof beneath the rim thereof communicating with and forming part of the lower end of said passageway and providing a throughway from the rim of the neck to the opening in the outer surface of the neck, a closure for said container, and a connecting member integral with the closure and extending down into the passageway into the opening in the outer surface of the neck.

2. A container of rubber or the like having a neck provided with a passageway extending longitudinally thereof between the inner and outer surfaces of the neck, said passageway opening at the upper rim of the neck, said neck having an opening in the outer surface thereof beneath the rim thereof communicating with and forming part of the lower end of said passageway and providing a throughway from the rim of the neck to the opening in the outer surface of the neck, a closure for said container, a connecting member integral with the closure and extending down into the passageway into the opening in the outer surface of the neck, a stud carried by said neck in the lower portion of said passageway and projecting laterally and outwardly through the opening in the surface of said neck, and said connecting member having a perforation near the free end thereof receiving said stud to connect the connecting member to the neck.

3. A container according to claim 2 in which the stud is integral with the material of the neck.

4. A container according to claim 2 in which the opening in the outer surface of the neck and at the bottom of the passageway is of a size and shape to be filled by the free end of the connecting member when the latter is mounted on the stud.

References Cited in the file of this patent

UNITED STATES PATENTS

| 2,215,392 | Freeman | Sept. 17, 1940 |
| 2,303,733 | Freeman | Dec. 1, 1942 |
| 2,317,269 | Hammarstrom | Apr. 20, 1943 |